(12) United States Patent
Cabrera et al.

(10) Patent No.: US 11,884,387 B2
(45) Date of Patent: Jan. 30, 2024

(54) ROTOR ASSEMBLY CONNECTABLE TO ROTOR HUB AND HAVING PITCH CONTROL

(71) Applicant: LOCKHEED MARTIN CORPORATION, Bethesda, MD (US)

(72) Inventors: Pedro L Cabrera, West Haven, CT (US); David H. Hunter, Cheshire, CT (US); David N. Schmaling, Southbury, CT (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 58 days.

(21) Appl. No.: 17/558,191

(22) Filed: Dec. 21, 2021

(65) Prior Publication Data

US 2023/0192280 A1    Jun. 22, 2023

(51) Int. Cl.
*B64C 27/32* (2006.01)
*B64C 27/10* (2023.01)
*B64C 27/72* (2006.01)

(52) U.S. Cl.
CPC .............. *B64C 27/32* (2013.01); *B64C 27/10* (2013.01); *B64C 27/72* (2013.01)

(58) Field of Classification Search
CPC .......... B64C 27/10; B64C 27/32; B64C 27/72
See application file for complete search history.

(56) References Cited

U.S. PATENT DOCUMENTS

| | | | |
|---|---|---|---|
| 4,332,525 A | 6/1982 | Cheney, Jr. | |
| 5,263,821 A | 11/1993 | Noehren et al. | |
| 5,690,474 A * | 11/1997 | Byrnes | B64C 27/33 416/134 A |
| 6,659,722 B2 | 12/2003 | Sehgal et al. | |
| 7,695,249 B2 | 4/2010 | Krauss et al. | |
| 9,475,576 B2 * | 10/2016 | Parsons | B64C 27/33 |
| 10,065,733 B2 | 9/2018 | Pfaller | |
| 2015/0086358 A1 * | 3/2015 | Filter | B64C 27/32 416/134 A |

(Continued)

OTHER PUBLICATIONS

Niranjan et al., "Helicopter rotor blade frequency evolution with damage growth and signal processing," Journal of Sound and Vibration, vol. 283, Issues 3-5, May 20, 2005, pp. 821-851.

(Continued)

*Primary Examiner* — Tien Q Dinh
*Assistant Examiner* — Katherine June Bolek
(74) *Attorney, Agent, or Firm* — Foley & Lardner LLP

(57) ABSTRACT

A rotor blade assembly connectable to a rotor hub configured to rotate about a center axis includes a torsional pitch member coupled to the rotor hub, a torque tube coupled to the torsional pitch member, wherein the torsional pitch member extends away from the center axis through a portion of the torque tube, a blade coupled to the torque tube, and a pitch control member coupled to the torque tube and configured to control a pitch angle of the blade, wherein the torsional pitch member includes a first curvilinear channel and a second curvilinear channel each having a front side and a back side, wherein the first curvilinear channel and the second curvilinear channel are disposed adjacent to each other, such that the back side of the first curvilinear channel faces the back side of the second curvilinear channel.

21 Claims, 10 Drawing Sheets

(56) References Cited

U.S. PATENT DOCUMENTS

2016/0167777 A1* 6/2016 Podgurski ............. B64C 27/605
                                                        416/147
2020/0377206 A1* 12/2020 Schmaling .............. B64C 27/48

OTHER PUBLICATIONS

Wilkie et al., "Rotating Shake Test and Modal Analysis of Model Helicopter Rotor Blade," NASA Technical Memorandum 4760, Jun. 1997 (20 pages).

* cited by examiner

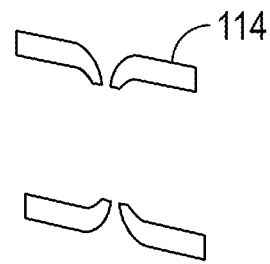
FIG. 11A	FIG. 11B
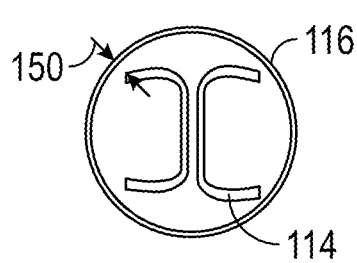
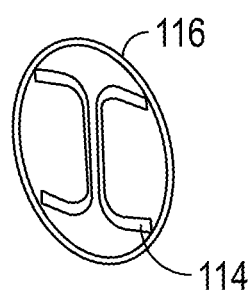
FIG. 12A	FIG. 12B
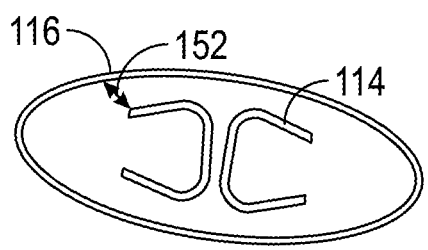
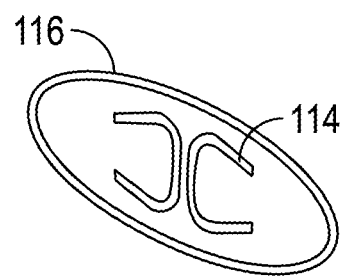
FIG. 13A	FIG. 13B
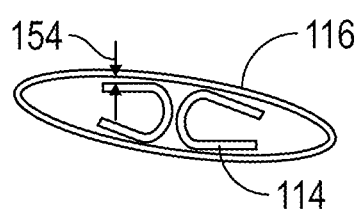
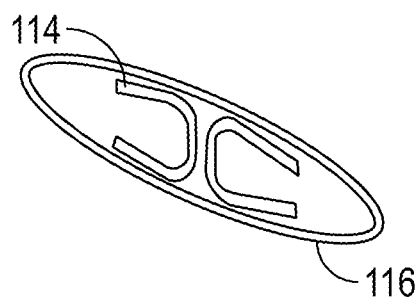
FIG. 14A	FIG. 14B

ROTOR ASSEMBLY CONNECTABLE TO ROTOR HUB AND HAVING PITCH CONTROL

STATEMENT REGARDING FEDERALLY SPONSORED RESEARCH OR DEVELOPMENT

This invention was made with Government support under Agreement No. W911W6-19-9-0005, awarded by the Army Contracting Command-Redstone Arsenal. The Government has certain rights in the invention.

FIELD

The present invention relates to a rotor blade assembly of a rotary-wing aircraft. More specifically, the present disclosure relates to a bearingless rotor blade assembly that includes a torque tube configured to adjust the pitch angle of the rotor blade.

BACKGROUND

Rotary-wing aircrafts, such as helicopters, include a rotor blade assembly having more than one blade rotate to generate lift. The rotor blades are generally coupled to a rotor hub such that the rotor blades rotate as the rotor hub rotates. The rotor blades, including the blade spar, may be coupled to the hub in a number of ways. For example, the rotor blades may be semi-rigidly attached to the rotor hub, rigidly attached, fully articulated, or any combination thereof. Semi-rigid rotor systems typically include two blades that are rigidly attached to the rotor hub, which is free to tilt with respect to the main rotor shaft via a flapping hinge (e.g., a gimbaled rotor assembly).

SUMMARY

Rigid rotor systems typically include two or more blades rigidly attached to the rotor hub. However, rigid rotor systems do not include flapping hinges, and therefore, the rotor blades do not pivot about a hinge with respect to the rotor hub. Instead, in some bearingless rotor systems the aircraft body tilts in response to the moment created by the controlled forces at the rotor head. Further, other bearingless rotor systems include rotor blades with integral flexbeams that allow the blades to bend under the various loads experienced by the blades to adjust the blade angle as the rotor hub rotates in a similar fashion as fully articulated rotor assemblies.

Fully articulated rotor assemblies allow each blade to lead or lag (e.g., move back and forth in plane), flap (e.g., move up and down about an inboard mounted hinge) independent of the other blades, and feather (e.g., rotate about the pitch axis to change lift). Fully articulated rotor assemblies are typically found on various single main rotor aircrafts. As the rotor hub spins, each blade responds to inputs from a control system to enable aircraft control. The center of lift on the entire rotor system moves in response to these inputs to effect pitch, roll, and upward motion. The magnitude of the lift force is based on the collective input, which changes pitch on all blades in the same direction at the same time. The location of this lift force is based on the pitch and roll inputs from the pilot. Therefore, the feathering angle of each blade (proportional to its own lifting force) changes as it rotates with the rotor, hence the name "cyclic control." As the lift on a given blade increases, it tends to flap upwards. The flapping hinge for the blade permits this motion and is balanced by the centrifugal force of the weight of the blade, which generally keeps the blade in the horizontal plane.

As discussed above, some bearingless rotor assemblies include rotor blades with integral flexbeams that allow the blades to bend under the various loads experienced by the blades to adjust the blade angle as the rotor hub rotates in a similar fashion as fully articulated rotor assemblies. In these bearingless rotor assemblies, the rotor assembly may accomplish flapping, feathering, and/or lead/lag via mechanical deformation of various components of the rotor assembly, rather than via hinges and/or bearings.

With respect to certain bearingless rotor assemblies, the number of components included in the bearingless rotor assembly may be lower than in fully articulated rotor systems, thereby reducing the weight of the rotor assemblies. Further, hinges and bearings may wear out during normal use of the rotary aircraft, and therefore, by removing these components the amount of required maintenance may be reduced. The exemplary non-limiting embodiments of the present disclosure allow for assemblies with these and other benefits. At least one embodiment relates to a rotor assembly including a rotor hub configured to rotate about a center axis, a torsional pitch member coupled to the rotor hub, a torque tube coupled to the torsional pitch member, wherein the torsional pitch member extends away from the center axis through a portion of the torque tube, a blade coupled to the torque tube, and a pitch control member coupled to the torque tube and configured to control a pitch angle of the blade. According to various embodiments, the pitch control member is configured to apply a torsional force to the torque tube to control the pitch angle of the blade.

According to various embodiments, the pitch control member is further configured to apply a torsional force to the torsional pitch member, such that the torsional pitch member experiences an amount of twist about a longitudinal axis extending away from the rotor hub. According to various embodiments, an amount of twist experienced by the torsional pitch member is smaller in magnitude at a location proximate the rotor hub than at a position further from the rotor hub. According to various embodiments, the torsional pitch member is integrally formed with the rotor hub. According to various embodiments, the torque tube is integrally formed with a blade spar extending away from the center axis. According to various embodiments, the torsional pitch member includes a first C-beam and a second C-beam, wherein the first C-beam and the second C-beam are back to back.

Another embodiment relates to a system including a first rotor hub configured to spin about a central axis in a first direction, a first torsional pitch member extending away from the central axis and coupled to the first rotor hub at a first position such that the first torsional pitch member does not hinge about the first rotor hub, a first blade spar coupled to the first rotor hub and defining a first pitch angle, a first torque tube coupled to the first torsional pitch member such that a portion of the first torque tube surrounds the first torsional pitch member, a second rotor hub configured to spin about the central axis in a second direction that is opposite the first direction, a second torsional pitch member extending away from the central axis and coupled to the second rotor hub at a second position such that the second torsional pitch member does not hinge about the second rotor hub, a second blade spar coupled to the second rotor hub and defining a second pitch angle, and a second torque tube coupled to the second torsional pitch member such that a portion of the second torque tube surrounds the second torsional pitch member. According to various embodiments, the system includes a pitch control assembly configured to control the first pitch angle and the second pitch angle.

According to various embodiments, the pitch control assembly includes a first pitch horn coupled to the first torque tube and the first torsional pitch member such that the first pitch horn may rotate about the first torsional pitch member, wherein rotation of the first pitch horn causes the first pitch angle to change, and a second pitch horn coupled to the second torque tube and the second torsional pitch member such that the second pitch horn may rotate about the second torsional pitch member, wherein rotation of the second pitch horn causes the second pitch angle to change. According to various embodiments, rotation of the first pitch horn further causes the first torsional pitch member to twist and wherein rotation of the second pitch horn further causes the second torsional pitch member to twist. According to various embodiments, the rotation of the first pitch horn does not cause the first torsional pitch member to twist at the first position and causes the first torsional pitch member to twist at a third position on the first torsional pitch member, wherein the third position is further from the first rotor hub than the first position. According to various embodiments, the first torsional pitch member is integrally formed with the first rotor hub. According to various embodiments, the first torque tube is integrally formed with the first blade spar. According to various embodiments, the first torsional pitch member includes an I-beam.

Another embodiment relates a method including providing, by a pitch control member, a pitch input to a pitch horn, wherein the pitch horn is coupled to a rotor assembly including a rotor hub configured to rotate about a center axis, a torsional pitch member coupled to the rotor hub, a torque tube coupled to the torsional pitch member, wherein the torsional pitch member extends away from the center axis through a portion of the torque tube, and a blade spar coupled to the torque tube and defining a pitch angle, and providing, by a motor device, a drive input to the rotor hub, wherein the rotor hub rotates in response to the drive input. According to various embodiments, the pitch horn is configured to apply a torsional force to the torque tube to control the pitch angle of the blade spar. According to various embodiments, the pitch horn is further configured to apply a torsional force to the torsional pitch member, such that the torsional pitch member experiences a twist along a longitudinal axis extending from the rotor hub. According to various embodiments, an amount of twist experienced by the torsional pitch member is smaller in magnitude at a location proximate the rotor hub than at a position further from the rotor hub. According to various embodiments, the torsional pitch member is integrally formed with the rotor hub.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which:

FIG. 11a and FIG. 11b are a cross sectional view of a blade assembly at a first location, according to an example embodiment.

FIG. 12a and FIG. 12b are a cross sectional view of a blade assembly at a second location, according to an example embodiment.

FIG. 13a and FIG. 13b are a cross sectional view of a blade assembly at a third location, according to an example embodiment.

FIG. 14a and FIG. 14b are a cross sectional view of a blade assembly at a fourth location, according to an example embodiment.

DETAILED DESCRIPTION

Figure 1:
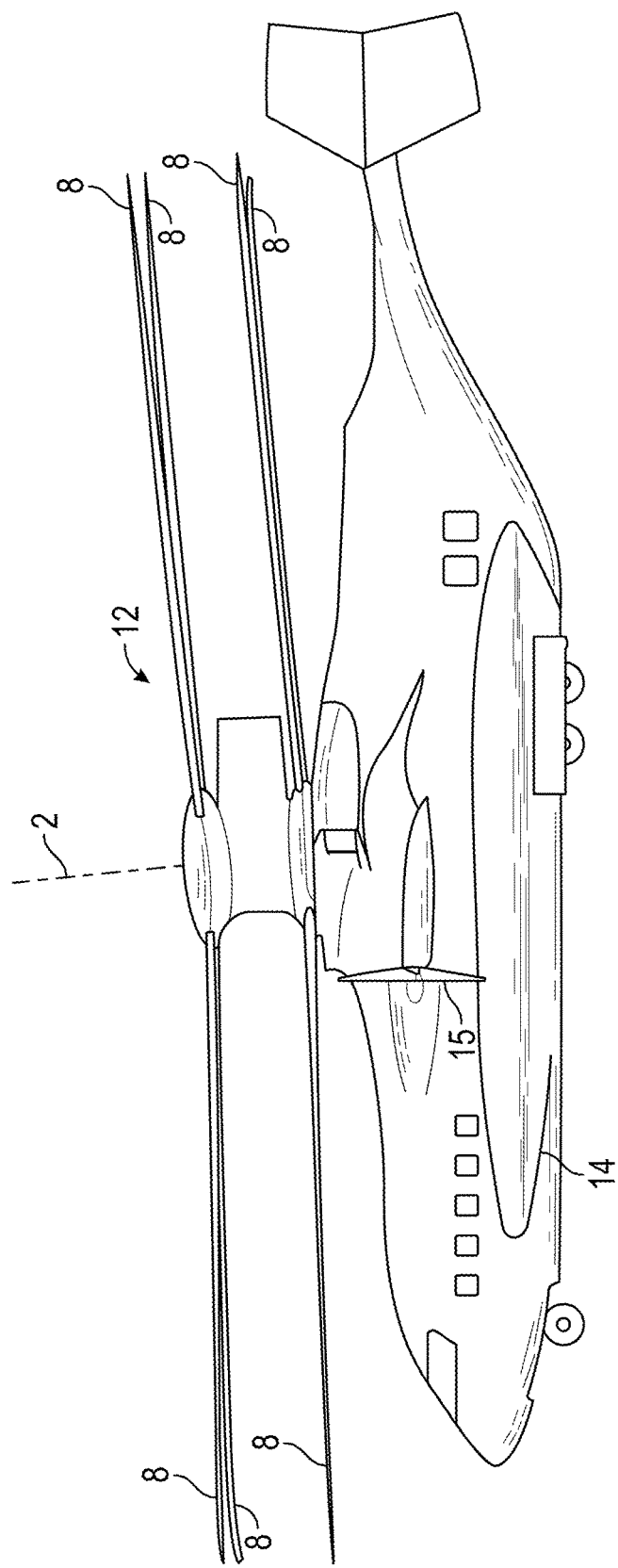
FIG. 1 is a perspective view of a rotary-wing aircraft, according to an example embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Conventional rotary-wing aircraft have a forward airspeed limited by a number of factors. Among these is the tendency of the retreating blade to stall at high forward airspeeds. As the forward airspeed increases, the airflow velocity across the retreating blade slows such that the blade may approach a stall condition. In contrast, the airflow velocity across the advancing blade increases with increasing forward speed. Forward movement of the helicopter thereby generates asymmetry of lift between the advancing and retreating sides of the rotor. This asymmetry may create an unstable condition if lift is not balanced across the advancing and retreating sides of the rotor.

One design approach to reducing the asymmetry of lift between the advancing and retreating sides of the rotor is to design the rotor blades to allow feathering (e.g., the rotation of the rotor blade around the span wise (pitch change) axis). For example, the rotor assembly may include a feathering hinge that allows the rotor blades to feather. However, the feathering hinge may add additional weight to the rotor assembly and may wear such that additional routine maintenance is required to maintain the feathering hinge.

Another design approach to reducing the asymmetry of lift between the advancing and retreating sides of the rotor is to design the rotor blades to allow flapping (e.g., the vertical movement of the rotor blade relative to the rotor hub). For example, the rotor assembly may include a flapping hinge that allows the rotor blades to flap. However, the flapping hinge may add additional weight to the rotor assembly and may wear such that additional routine maintenance is required to maintain the feathering hinge.

According to various embodiments, a rotary-wing aircraft may include rotor blades that are rigidly coupled to the rotor hub, thereby reducing the weight and maintenance requirements of the rotary-wing aircraft. According to various embodiments, the rotor assembly may be designed to mechanically flex to allow the rotor blades to feather. In other words, the rotor assembly may be designed such that the rotor blade allows for elastic deformation when acted upon by torsional moments (i.e. the rotor blade is torsionally stiff but is connected to the rotor hub by a torsionally soft member). Additionally or alternatively, the rotor assembly may be designed to mechanically flex to allow the rotor blades to flap. In other words, the rotor assembly may be designed such that the rotor blade allows for elastic deformation when acted upon by out-of-plane forces (i.e., the rotor blade has a relatively low out-of-plane stiffness). For example, the rotor assembly may include a rotor blade that is coupled to the rotor hub via a flexible beam (e.g., a "flex beam"). The flexible beam may elastically deform under in-plane forces and/or out-of-plane forces such that the rotor blades may feather and/or flap. In this sense, the overall weight and maintenance requirements of the rotor assembly may be decreased by omitting a feathering hinge and a flapping hinge.

Another design approach to reducing the asymmetry of lift between the advancing and retreating sides of the rotor is to include two or more contra-rotating rotor blade assemblies. A rotary wing aircraft with a contra-rotating rigid rotor system is configured to achieve higher speeds compared to conventional single rotor helicopters due, in part, to the balance of lift between the advancing sides of the main rotor blades on the upper and lower rotor systems. Thus, unlike single rotor helicopters, reducing the asymmetry of lift between the advancing and retreating sides of the rotor may be accomplished without feathering (e.g., via a pitch bearing that allows the orientation of the blade to change relative to a spanwise axis) and/or flapping (e.g., via flapping hinges, deflection of the blades, etc.) of the blades. As will be described further herein, a rotor blade assembly having a contra-rotating rotor system with rigidly attached rotor blades that are stiff in-plane and stiff out-of-plane is disclosed according to various embodiments. In this sense, the weight and maintenance requirements may be decreased (e.g., due to the lack of feathering hinges and/or flapping hinges) while the impact of the asymmetry of lift between the advancing and retreating sides of the rotor is also reduced as the contra-rotating rotors have imbalances which counter balance each other (e.g., due to the contra-rotating rotor blades that are stiff in-plane and out-of-plane). For example, according to various embodiments described herein, there may be more than a 50% reduction in rotor hub components (e.g., a 60% reduction), decreased sustainment costs, decreased manufacturing costs, decreased lead time, and a weight savings of on the order of several hundred pounds.

Referring generally to the figures, systems and methods of pitching a rotor blade assembly of a rotary-wing aircraft are described. According to an example embodiment, the rotor assembly includes an upper rotor hub configured to spin about a central axis in a first direction and a lower rotor hub configured to spin about the central axis in a second direction that is opposite the first direction. The rotor assembly further includes a first torsional pitch member extending away from the central axis and coupled to the upper rotor hub at a first position such that the first torsional pitch member does not hinge about the upper rotor hub, wherein the first torsional pitch member is stiff in-plane and stiff out-of-plane, a first blade spar coupled to the upper rotor hub and defining a first pitch angle, and a first torque tube coupled to the first torsional pitch member such that a portion of the first torque tube surrounds the first torsional pitch member. The rotor assembly further includes a second torsional pitch member extending away from the central axis and coupled to the lower rotor hub at a second position such that the second torsional pitch member does not hinge about the lower rotor hub, wherein the second torsional pitch member is stiff in-plane and stiff out-of-plane, a second blade spar coupled to the lower rotor hub and defining a second pitch angle, and a second torque tube coupled to the second torsional pitch member such that a portion of the second torque tube surrounds the second torsional pitch member.

According to various embodiments, a torsional pitch member that is stiff-in-plane will result in a rotor system having a first edgewise blade frequency within a predetermined range. The blade frequency corresponds to the rotational frequency at a given rotor speed under specified conditions. For example, the blade frequency may be measured at different modes across a range of motor speeds as measured in intervals (intervals of 100 rpm, for example) when the non-oscillatory collective pitch of the blades is fixed at zero degrees and the collective pitch of the rotor is sinusoidally oscillated (e.g., by a control system such as a hydraulic control system). W. Keats Wilkie et al., "Rotating Shake Test and Modal Analysis of Model Helicopter Rotor Blade," NASA Technical Memorandum 4760 (June 1997) and Niranj an Roy et al., "Helicopter rotor blade frequency evolution with damage growth and signal processing," Journal of Sound and Vibration, Volume 283, Issues 3-5, 20 May 2005, pp. 821-851 describe modal blade frequency measurements involving processing blade and pitch link strain gauge signals with a signal analyzer; generating a frequency response function with the analyzer from the measurements; and obtaining a frequency value for the blade from the amplitude peak of the frequency response function.

According to various embodiments, a torsional pitch member that is stiff-in-plane will result in a rotor system having a first edgewise blade frequency of about 1 Hz. According to various embodiments, a torsional pitch member that is stiff-in-plane will result in a rotor system having a first edgewise blade frequency that is higher than 1 Hz. Conversely, a torsional pitch member that is soft-in-plane will result in a rotor system having a first edgewise blade frequency that is less than 1 Hz. Further, according to various embodiments, a torsional pitch member that is stiff-out-of-plane will result in a rotor system having a first flapwise (e.g., out-of-plane) frequency greater than 1.1 Hz (e.g., about 1.1 Hz to about 1.3 Hz). According to further embodiments, a torsional pitch member is stiff-out-of-plane will result in a rotor system having a first flapwise (e.g., out-of-plane) frequency greater of about 1.3 Hz. Conversely, a torsional pitch member is soft-out-of-plane will result in a rotor system having a first flapwise (e.g., out-of-plane) frequency less than or equal to about 1.1 Hz.

According to various embodiments, the rotor assembly further includes a pitch control assembly configured to control the first pitch angle and the second pitch angle. The pitch control assembly may include a first pitch horn coupled to the first torque tube and the first torsional pitch member such that the first pitch horn may rotate about the first torsional pitch member, wherein rotation of the first pitch horn causes the first pitch angle to change, and a second pitch horn coupled to the second torque tube and the second torsional pitch member such that the second pitch horn may rotate about the second torsional pitch member, wherein rotation of the second pitch horn causes the second pitch angle to change. The pitch horns may each be coupled to pitch control member (e.g. a pitch link or pitch rod coupled to a swash plate) that allows an operator of the aircraft to control the pitch of the first rotary blade and the second rotary blade (e.g., as a part of taking off and/or landing the rotary aircraft).

According to various embodiments, rotation of the first pitch horn further causes the first torsional pitch member to twist, and rotation of the second pitch horn further causes the second torsional pitch member to twist. However, according to various embodiments, the rotation of the first pitch horn does not cause the first torsional pitch member to twist at the first position (e.g., the position that the first torsional pitch member is coupled to the first rotor hub) and causes the first torsional pitch member to twist at a third position on the first torsional pitch member, wherein the third position is further from the upper rotor hub than the first position.

According to various embodiments, the first torsional pitch member is integrally formed with the upper rotor hub. For example, the first torsional pitch member and the upper rotor hub may be manufactured as a single piece of material. Further, according to various embodiments, the first torque tube is integrally formed with the first blade spar. For example, both the first torque tube and the first blade spar may be manufactured as a single piece of composite material (e.g., carbon fiber, poly-paraphenylene terephthalamide (K29) (e.g. Kevlar®), fiberglass, etc.). Further, according to various embodiments, the first torsional pitch member includes an I-beam. Additionally or alternatively, the first torsional pitch member may include two C-beams that are positioned back to back. In either example, the first torsional pitch member may be stiff in-plane and out-of-plane as a result of the mechanical structure of the first torsional pitch member.

Referring now to FIG. 1, a perspective view of a rotary-wing aircraft 10 is shown according to an example embodiment. The rotary-wing aircraft 10 includes a dual, counter-rotating, coaxial rotor system 12. The rotor system 12 includes a plurality of blades 8 which rotate about an axis of rotation 2. The rotary-wing aircraft 10 includes an airframe 14 which supports the dual, counter rotating, coaxial rotor system 12 as well as a propulsive system 15 which provides translational thrust generally parallel to an aircraft longitudinal axis. It should be appreciated that while the rotary-wing aircraft 10 shows the propulsive system 15 near the center of the rotary-wing aircraft 10, the propulsive system 15 may be located elsewhere, such as near the tail of the rotary-wing aircraft 10.

Figure 2:
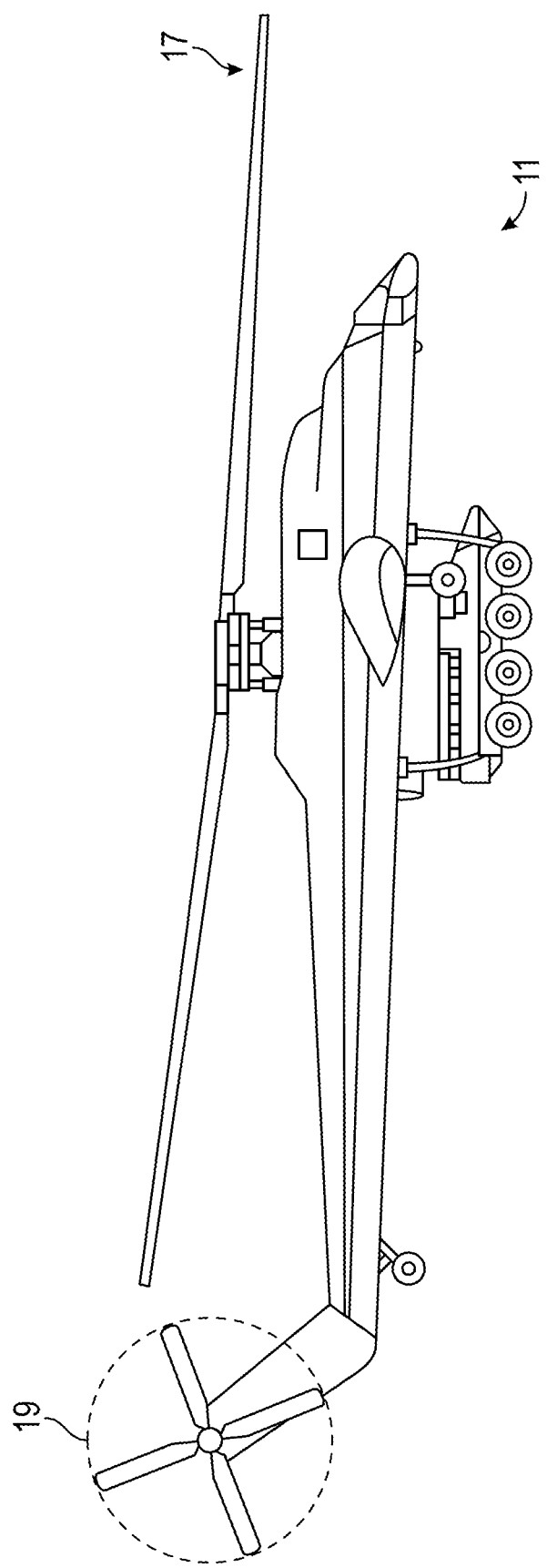
FIG. 2 is a perspective view of a single rotor flying helicopter, according to an example embodiment.

Referring now to FIG. 2, a perspective view of a single rotor flying helicopter 11 is shown according to an example embodiment. The helicopter includes a single main rotor blade system 17 (similar to the rotor system 12) and an anti-torque rotor 19 mounted to an extended tail. It should be appreciated that the two particular type rotary-wing aircraft configuration is illustrated in FIGS. 1 and 2 are exemplary in nature and not intended to be limiting.

Figure 3:
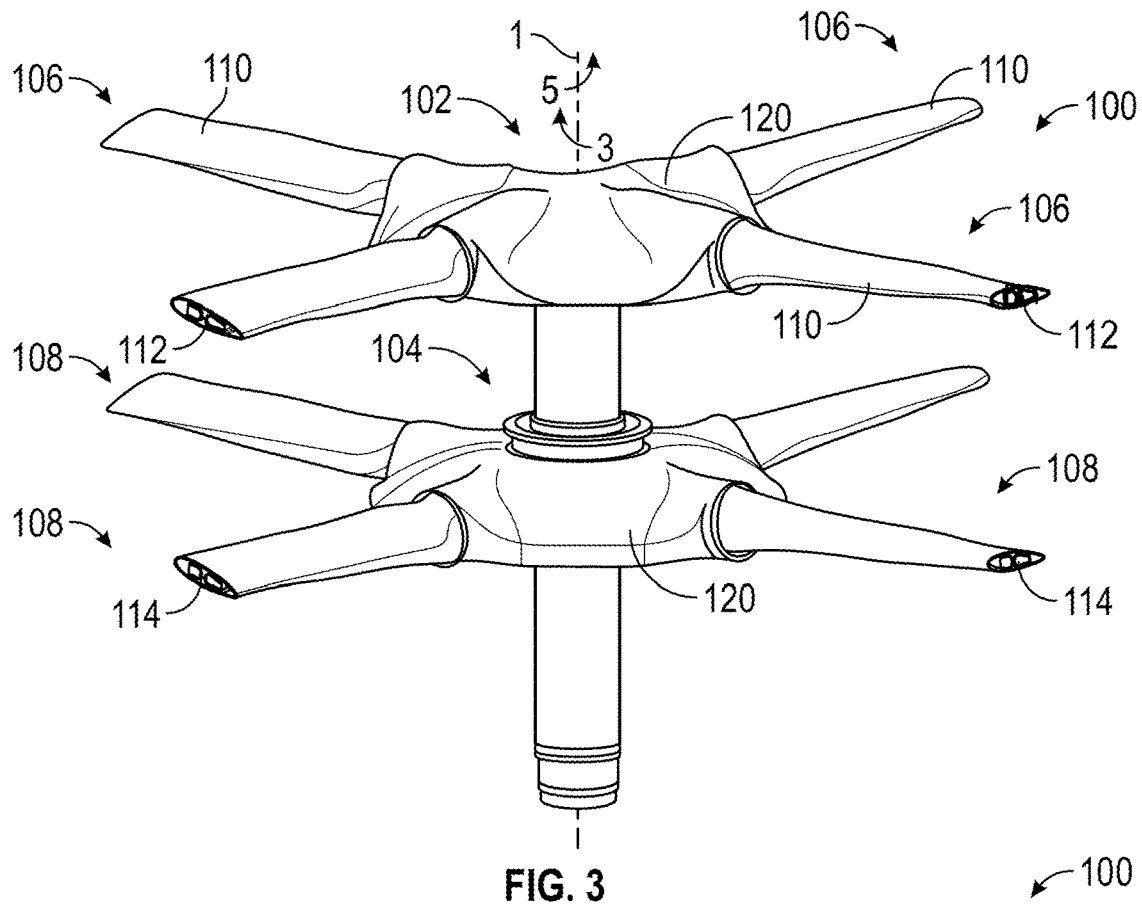
FIG. 3 is a partial view of a rotor system, according to an example embodiment.

Referring now to FIG. 3, a partial view of a rotor system 100 is shown according to an example embodiment. The rotor system 100 may be the same or similar to the rotor system 12 discussed above in FIG. 1. For example, the rotor system 100 is shown as a dual, counter-rotating, coaxial rotor system 100. The rotor system 100 includes an upper rotor assembly 102 and a lower rotor assembly 104. The upper rotor assembly 102 and the lower rotor assembly 104 are configured to rotate about a central axis 1 of the rotor system 100. According to various embodiments, the upper rotor assembly 102 is configured to rotate in a first direction 3 about the central axis 1 and the lower rotor assembly 104 is configured to rotate in a second direction 5 about the central axis 1. As shown, the upper rotor assembly 102 and the lower rotor assembly 104 include structures 120 that surround a portion of the rotor assemblies 102, 104. The structures 120 may be manufactured from a composite material and may surround a portion of the rotor assemblies 102, 104 to prevent foreign matter (e.g., debris) from entering the rotor assemblies 102, 104.

Figure 4:
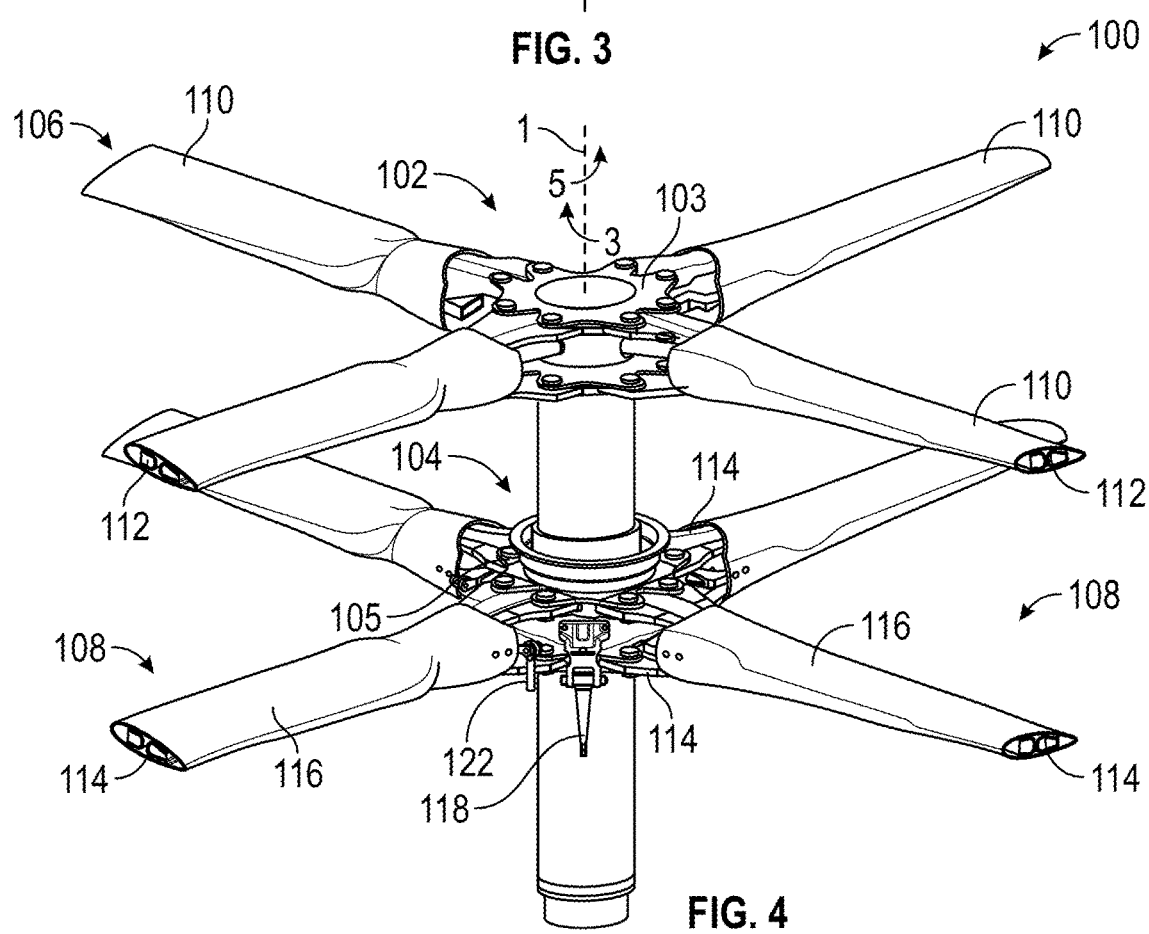
FIG. 4 is a partial view of a rotor system of FIG. 3, according to an example embodiment.

Referring now to FIG. 4, a partial view of the rotor system 100 is shown according an example embodiment. As shown, the structures 120 are hidden to aid in viewing of the rotor assemblies 102, 104. According to various embodiments, the upper rotor assembly 102 includes a rotor hub 103 (e.g., a first rotor hub, an upper rotor hub, etc.) that rotates about the central axis 1. As shown, the rotor hub 103 is coupled to a plurality of blade assemblies 106. As is discussed in further detail below, each blade assembly 106 (e.g., the blade 8 discussed above with respect to FIG. 1) includes a blade spar (e.g., positioned within the blade 8), a torque tube 110 coupled to the blade 8 (e.g., via a bolt assembly, integrally formed from a single piece of composite material, etc.), a skin 9 surrounding at least a portion of the blade 8, and a torsional pitch member (torsional pitch controller) 112 that is coupled to the rotor hub 103 and a portion of the torsional pitch member 112 is positioned within the torque tube 110.

Similarly, the lower rotor assembly 104 includes a plurality of blade assemblies 108. The blade assemblies 108 (e.g., the blade 8 discussed above with respect to FIG. 1) may be the same or similar to the blade assemblies 106. For example, the blade assemblies 108 includes a blade spar, which is not shown in FIG. 4, a torque tube 116 coupled to the blade spar (e.g., via a bolt assembly, welded together, integrally formed from a single piece of composite material, etc.), and a torsional pitch member 114 that is coupled to a rotor hub 105 (e.g., a second rotor hub, a lower rotor hub, etc.) and a portion of the torsional pitch member 114 is positioned within the torque tube 116. However, the upper rotor assembly 102 and the lower rotor assembly 104 may be designed to rotate in opposite directions, and, therefore, may not be identical to one another.

The rotor system 100 further includes a scissors link 118 coupled to the rotor hub 105. According to various embodiments, the scissors link 118 is coupled to a swashplate (not shown) such that the swashplate rotates in conjunction with the rotor hub 105. Further, the rotor system 100 includes a pitch control member (a pitch controller), shown as a pitch control rod 122 that is configured to receive a pitch control input. For example, the pitch control rod 122 may be coupled to a pitch control system that is configured to receive a pitch control input from an operator of the rotary-wing aircraft 10 (e.g., via cockpit controls) to control the pitch angle of the blade spars by causing the torque tube 116 to twist, which causes the torsional pitch member 114 to twist and further cause the pitch angle of the blade spar to change (e.g., by altering an angle of attack of the blade 8), as will be discussed in further detail below.

Figure 5:
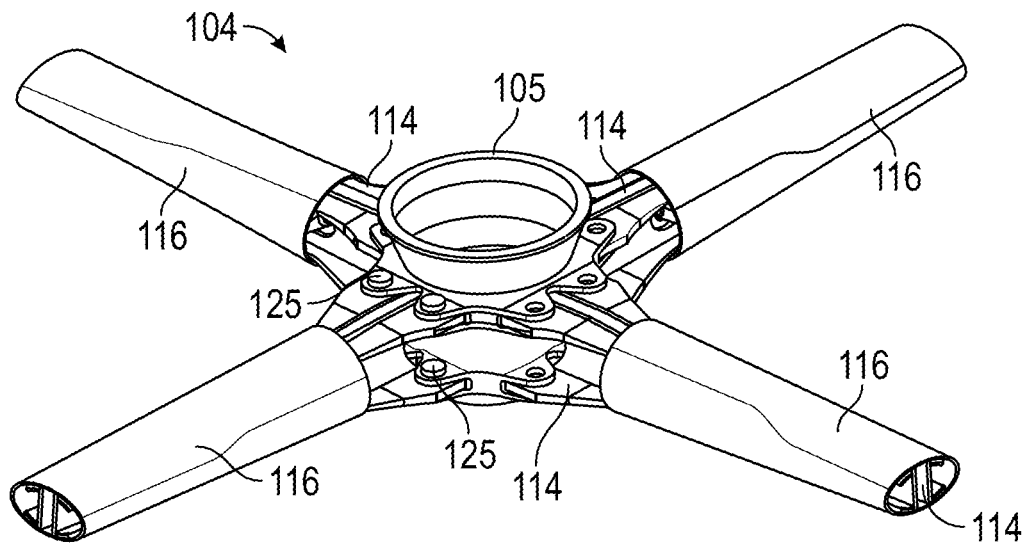
FIG. 5 is a partial view of a lower rotor assembly, according to an example embodiment.
Figure 6:
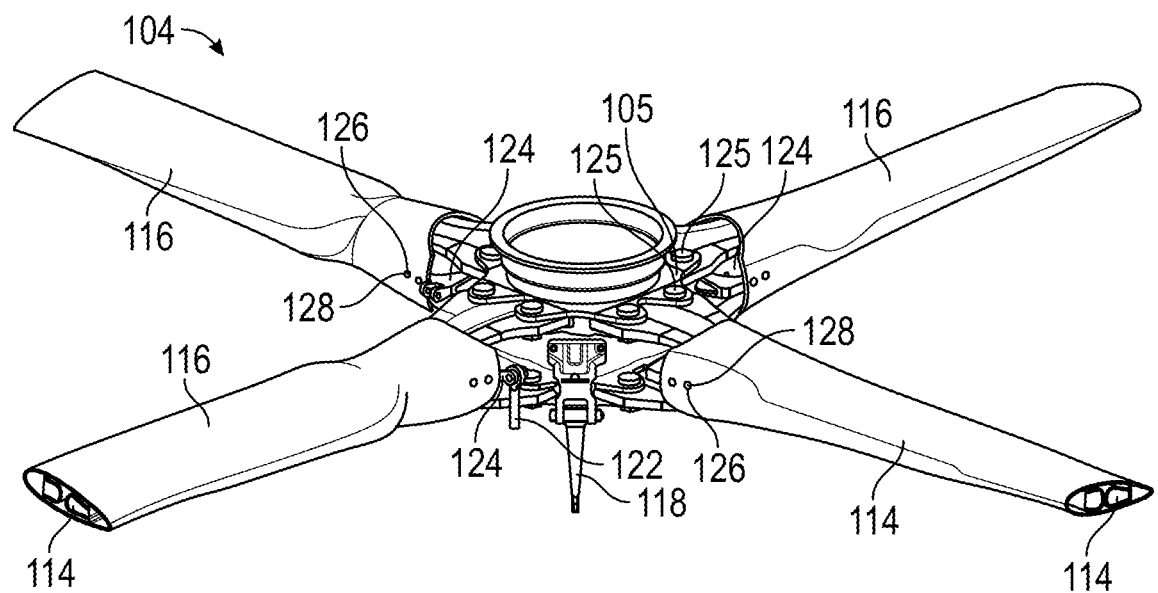
FIG. 6 is a partial view of the lower rotor assembly of FIG. 5, according to an example embodiment.
Figure 7:
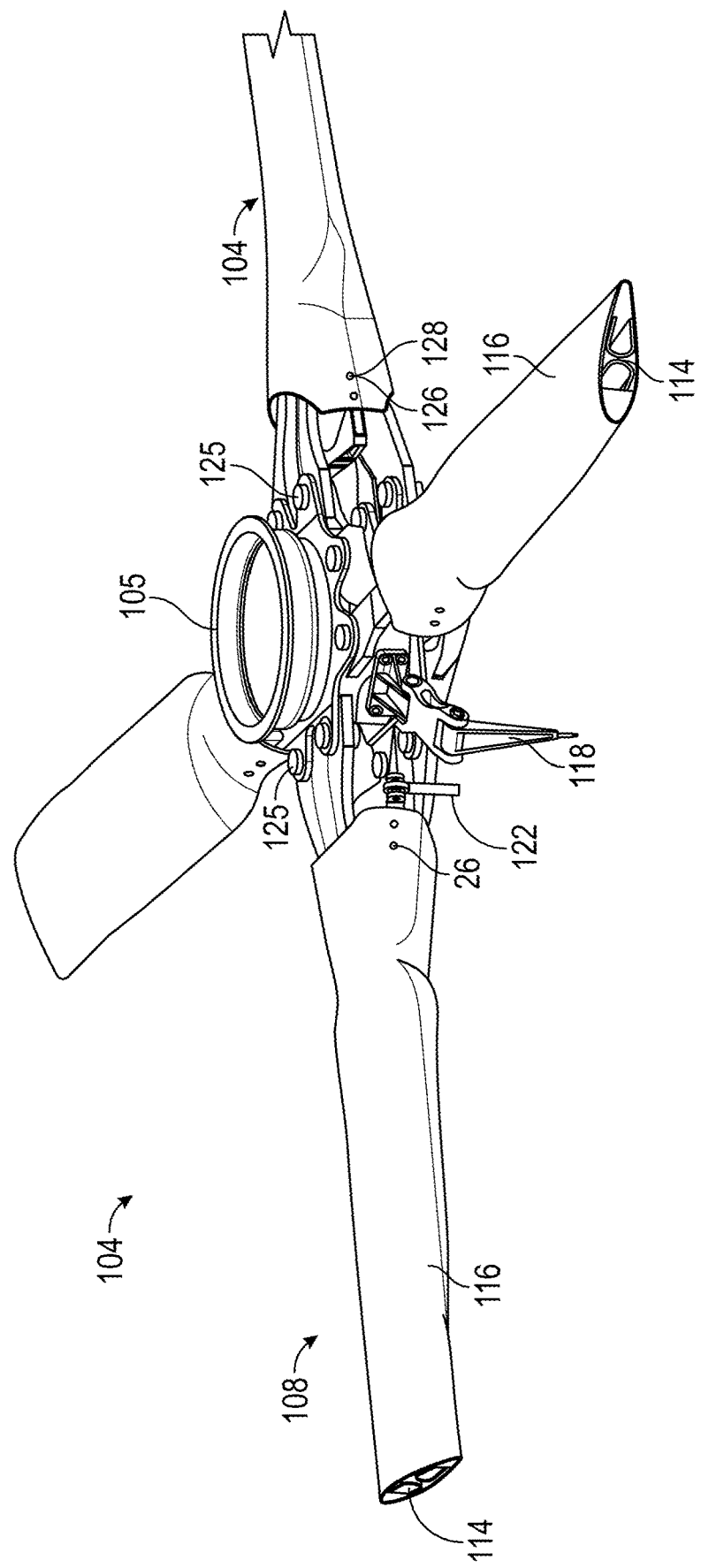
FIG. 7 is a partial view of the lower rotor assembly of FIG. 5, according to an example embodiment.

Referring now to FIGS. 5-7, a partial view of the lower rotor assembly 104 is shown according to an example embodiment. As discussed above, the lower rotor assembly 104 includes a plurality blade assemblies 108 coupled to the rotor hub 105. As shown, the torsional pitch member 114 is coupled to the rotor hub 105 via a plurality of bolts 125. However, according to other embodiments, the torsional pitch member 114 may be coupled to the rotor hub 105 in other ways, such as being integrally formed from a single piece of material. In this example, the lower rotor assembly 104 weight may be reduced due to the lack of bolts 25 required to couple the torsional pitch member 114 to the rotor hub 105.

Further, as discussed above, the lower rotor assembly 104 includes a pitch control rod 122 that is configured to control the pitch angle of the blade spar. As shown, the pitch control rod 122 is coupled to a pitch horn 124. For example, as shown, the pitch control rod 122 is hingedly coupled to the pitch horn 124. As will be discussed further below with respect to FIG. 9, the pitch horn 124 is coupled to the torque tube 116 such that the pitch horn 124 is configured to apply a torsional force to the torque tube 116. For example, the torque tube 116 may include a plurality of apertures 128 on both sides of the torque tube 116 that are configured to receive a plurality of projections 126 found on the pitch horn 124. In this sense, when the pitch horn 124 rotates, such as when a downward force is applied to the pitch control rod 122, a torsional force is applied to the torque tube 116, thereby causing the torque tube 116 to twist. The torque tube 116 is further coupled to the blade spar, and therefore, the twisting of the torque tube 116 causes the pitch angle of the blade spar to change (e.g., by altering an angle of attack of the blade 8).

According to various embodiments, the torque tube 116 may be integrally formed with the blade spar. However, according to various embodiments, the torque tube 116 may be coupled to the blade spar via other means (e.g., bolted, welded, etc.). Further, as is discussed further below the torque tube 116 is coupled to the torsional pitch member 114 such that when the pitch horn 124 causes the torque tube 116 to twist, at least a portion of the torsional pitch member 114 also twists in response.

Figure 8:
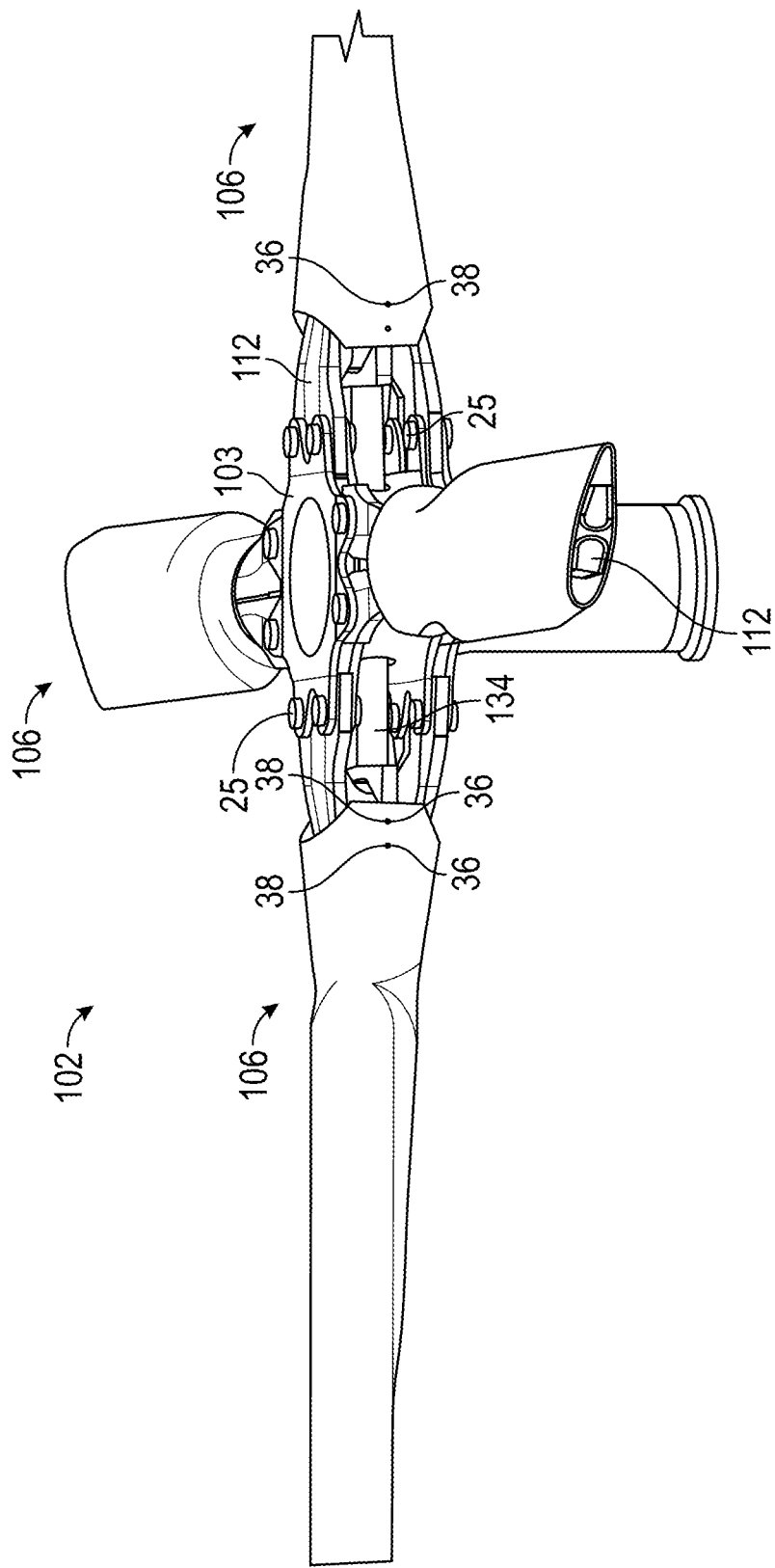
FIG. 8 is a partial view of an upper rotor assembly, according to an example embodiment.

Referring now to FIG. 8, a partial view of the upper rotor assembly 102 is shown according to an example embodiment. As discussed above, the upper rotor assembly 102 includes a plurality blade assemblies 106 coupled to the rotor hub 103. As shown, the torsional pitch member 112 is coupled to the rotor hub 103 via a plurality of bolts 25. However, according to other embodiments, the torsional pitch member 112 may be coupled to the rotor hub 103 in other ways, such as being integrally formed from a single piece of material. In this example, the upper rotor assembly 102 weight may be reduced due to the lack of bolts 25 required to couple the torsional pitch member 114 to the rotor hub 103.

Further, as discussed above, the upper rotor assembly 102 includes a pitch control member (e.g., the pitch control rod 122 shown in FIGS. 5-7) that is configured to control the pitch angle of the blade spar. For example, the pitch control member is coupled to a pitch horn 134. The pitch horn 124 is coupled to the torque tube 110 such that the pitch horn 134 is configured to apply a torsional force to the torque tube 110. For example, the torque tube 110 may include a plurality of apertures 38 on both sides of the torque tube 116 that are configured to receive a plurality of projections 36 found on the pitch horn 134. In this manner, when the pitch horn 134 rotates, a torsional force is applied to the torque tube 110, thereby causing the torque tube 110 to twist. The torque tube 110 is further coupled to the blade spar, and therefore, the twisting of the torque tube 110 causes the pitch angle of the blade spar to change from a first angle to a second angle (e.g., by altering a an angle of attack of the blade 8). According to various embodiments, the torsional pitch member experiences a first torsional load at the first angle (e.g., 0 Pa) and a second torsional load at the second angle, wherein the first torsional load is less than the second torsional load. According to various embodiments, the torque tube 110 may be integrally formed with the blade spar. However, according to various embodiments, the torque tube 110 may be coupled to the blade spar via other means (e.g., bolted, welded, etc.). Further, as is discussed further below the torque tube 110 is coupled to the torsional pitch member 112 such that when the pitch horn 134 causes the torque tube 110 to twist, at least a portion of the torsional pitch member 112 also twists in response.

Figure 9:
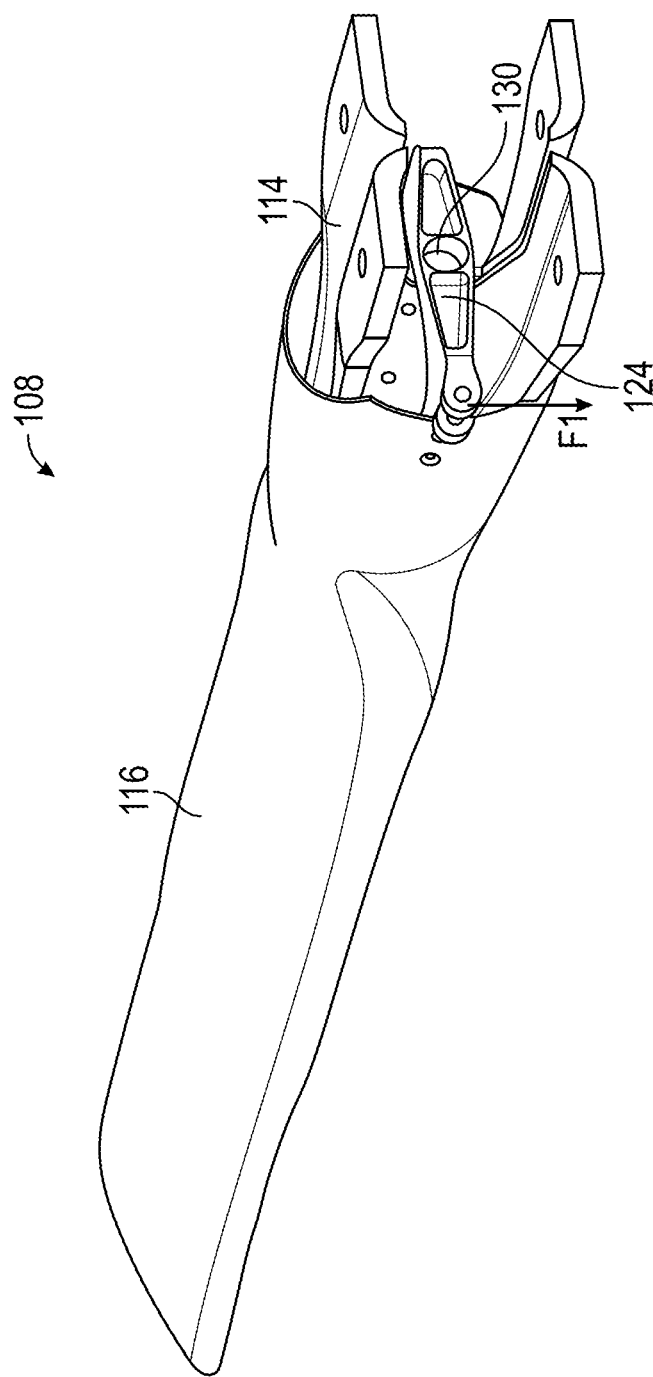
FIG. 9 is a partial view of a blade assembly, according to an example embodiment.

Referring now to FIG. 9, a partial view of the blade assembly 108 is shown according to an example embodiment. As shown, the pitch horn 124 is coupled to the torque tube 116 and the torsional pitch member 114. For example, the pitch horn 124 is coupled to the torsional pitch member 114 via a linkage 130 (e.g., a snubber bearing). Thus, the pitch horn 124 may rotate relative to the end of the torsional pitch member 114 about the linkage 130. For example, if a force $F_1$ is applied to the end of the pitch horn 124 (e.g., by the pitch control rod 122 shown in FIGS. 5-7), the pitch horn 124 rotates about the linkage 130. As a result, the pitch horn 124, which is coupled on both ends to the torque tube 116, causes the torsional pitch member 112 to twist by applying a torsional force to the torque tube 116.

Figure 10:
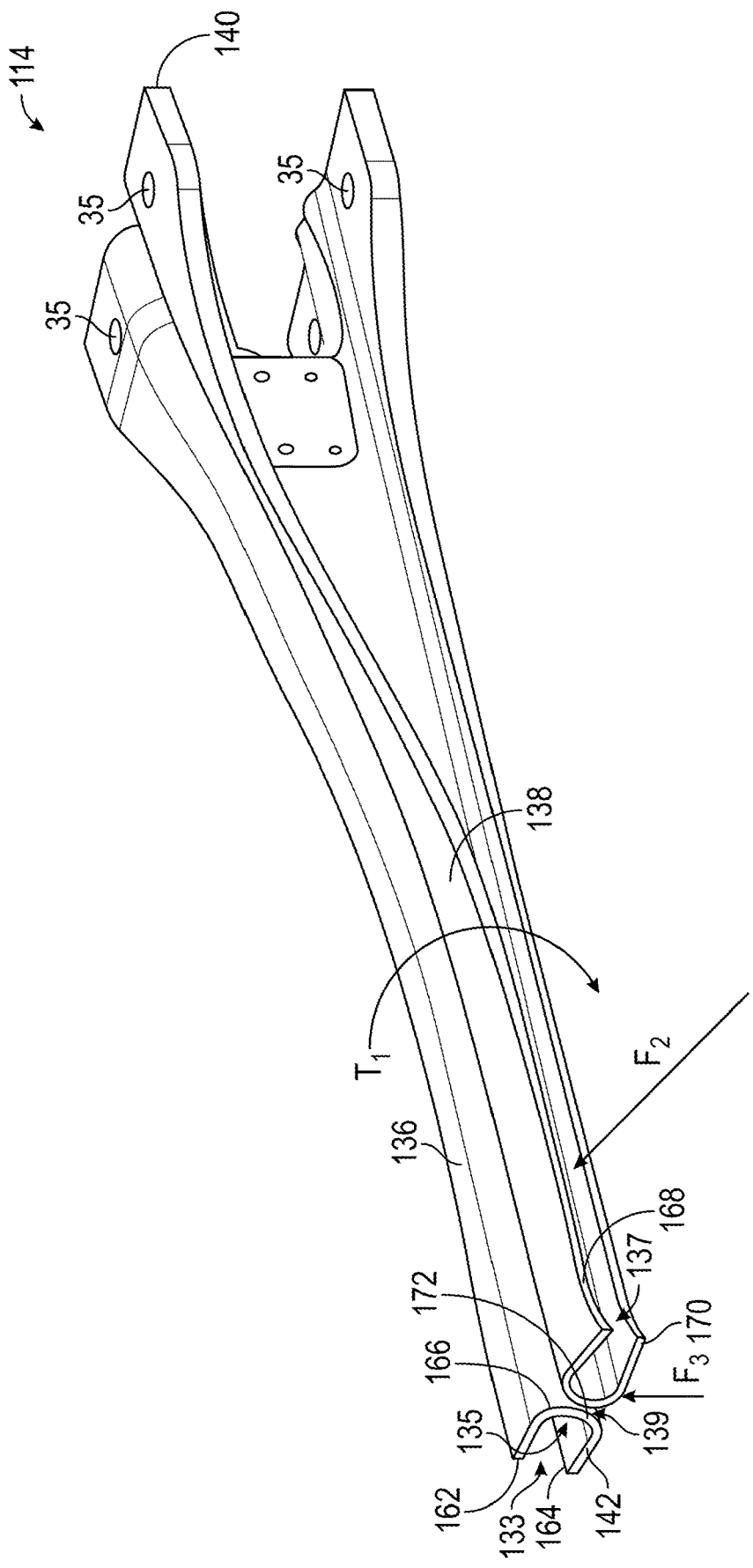
FIG. 10 is a perspective view of a torsional pitch member, according to an example embodiment.

Referring now to FIG. 10, a perspective view of a torsional pitch member 114 is shown according to an example embodiment. As is discussed above, the torsional pitch member 114 may be coupled to a rotor hub via a plurality of bolts (e.g., via a plurality of mounting apertures 35) proximate the first end 140 of the torsional pitch member 114. Further, according to various embodiments, a second end 142 of the torsional pitch member 114 may be coupled to or integrally formed with the blade spar.

As shown, the torsional pitch member 114 includes two curvilinear channels which may be beams shaped to have specific profiles. For example, the curvilinear beams may include so-called "C-beams" generally having the shape of the letter C. As seen in FIG. 10, torsional pitch member 114 is provided with a first C-beam 136 and a second C-beam 138 that are back to back with one another. As shown, the first C-beam 136 includes a front side 133 and a back side 135 opposite the front side 133. The front side 133 includes a first leg 162 and a second leg 164. The back side 135 includes a rounded portion 166. The second C-beam 138 includes a front side 137 and a back side 139 opposite the front side 137. The front side 137 includes a first leg 168 and a second leg 170. The back side 135 includes a rounded portion 172 that is back-to-back with the rounded portion 166 of the first C-beam 136. Thus, the torsional pitch member 114 includes a first C-beam 136 and a second C-beam 138 each having a front side 133, 137 and a back side 135, 139, wherein the first C-beam 136 and the second C-beam 138 are disposed adjacent to each other, such that the back side 135 of the first C-beam 136 faces the back side 139 of the second C-beam 138. The geometry of torsional pitch member 114 results in a torsional pitch member that is stiff in-plane (e.g., relatively small amounts of deformation under an in-plane force $F_2$), stiff out-of-plane (e.g., relatively small amounts of deformation under an out-of-plane force $F_2$), and has a relatively low torsional stiffness (e.g., experiences relatively high amounts of twist under torsional force $T_1$). Therefore, unlike a blade assembly that includes a flexible beam, which is less stiff in-plane and/or out-of-plane, the blade assembly 108 is more resistant to lead and lag deflections (e.g., in-plane deflections) while still allowing the pitch angle of the blade spar to be adjusted by applying a torsional force to the torque tube 116 (e.g., as a result of the low torsional stiffness).

Further, as the torsional force is applied to the torque tube 116, a portion of the torsional pitch member 114 twists to accommodate the twisting of the torque tube 116. For example, due to the geometry of the torsional pitch member 114, the torsional pitch member 114 may experience the highest amount of twisting near second end 142 and relatively small, or no twisting, near the first end 140 when a torsional force is applied to the torque tube. It should be appreciated that, while the torsional pitch member 114 is shown as two C-beams back to back, a torsional pitch member that is stiff in-plane and stiff out-of-plane while having a relatively low torsional stiffness may also be realized using other designs, such as an I-beam shaped torsional pitch member.

Referring now to FIGS. 11a-14b, various cross sectional views of the torsional pitch member 114 and the torque tube 116 at various radial increments are shown according to an example embodiment. As shown in FIGS. 11a and 11b, the cross sectional view of the torsional pitch member 114 is shown at a location proximate the first end 140 (see FIG. 10). As shown in FIG. 8, the torque tube 116 does not fully extend over the entire torsional pitch member 114, and, therefore, the torque tube 116 is not shown in FIGS. 11a and 11b. As shown in FIGS. 12a and 12b, the cross sectional view of the torsional pitch member 114 is shown at a location proximate between the first end 140 and the second end 142 (e.g., between 10%-20% of the radial length from the central axis 1, e.g., about 15% or about 12% of the radial length). As shown in FIG. 12a, there is relatively little clearance 150 between the torque tube 116 and the torsional pitch member 114 because the torque tube 116 is relatively circular at this position, and therefore, when the torque tube 116 twists, it does not interfere with the torsional pitch member 114.

As shown in FIGS. 13a and 13b, the cross sectional view of the torsional pitch member 114 is shown at a location proximate between the first end 140 and the second end 142 (e.g., 20% of the radial length from the central axis 1). As shown in FIG. 13a, there is a greater clearance 152 between the torque tube 116 and the torsional pitch member 114 because the torque tube 116 is relatively oval-shaped at this position, and therefore, as the torque tube 116 twists, it may interfere with the torsional pitch member 114 without this clearance. As shown in FIGS. 14a and 14b, the cross sectional view of the torsional pitch member 114 is shown at a location proximate the second end 142 (e.g., about 33% of the radial length from the central axis 1, between about 30% to about 40% of the radial length from the central axis 1, or about 30% of the radial length from the central axis 1). As shown in FIG. 14a, there is a clearance 154 (a first clearance) that is relatively low between the torque tube 116 and the torsional pitch member 114, and therefore, as the torque tube 116 twists, the torque tube 116 may come into contact with the torsional pitch member 114. It should be appreciated that, according to various embodiments, the blade assembly 108 may transition to the blade spar proximate this location. As shown, there is a relatively smaller clearance (a second clearance) between the torque tube 116 and the torsional pitch member 114. Thus, as the torque tube 116 twists, the torque tube 116 interfaces with the torsional pitch member 114, thereby causing the torsional pitch member 114 to twist as well. The amount of twist experienced by the torsional pitch member 114 is at its relative highest at this position and gradually decreases until the position attained as shown in FIGS. 11a and 11b.

Figure 15:
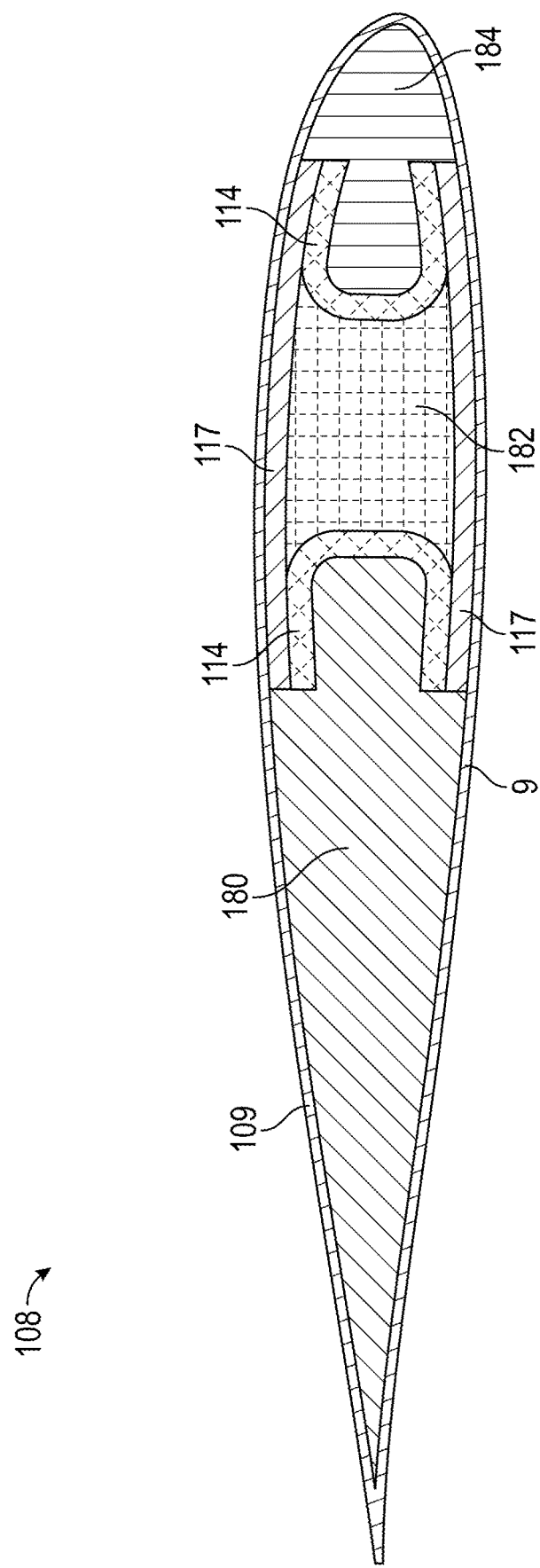
FIG. 15 is a cross sectional schematic view of the blade assembly of FIG. 9, according to an example embodiment.

Referring now to FIG. 15, a cross sectional schematic view of the blade assembly 108 is shown, according to an example embodiment. The cross sectional schematic view represents a cross section of the blade assembly 108 beyond an edge of the torque tube 116 shown above in FIG. 9. It should be appreciated that each blade assembly 108 included in the rotor system 100 may include the same or similar features of the blade assembly 108 depicted in FIG. 15.

As shown, the blade assembly 108 includes a skin 109 that surrounds some or all of the blade assembly 108. The skin 109 may define aerodynamic properties of the blade 108. According to various embodiments, the skin 109 may be manufactured from a composite material.

As shown, the torsional pitch member 114 includes two curvilinear channels which may be beams shaped to have specific profiles. For example, the curvilinear beams may include so-called "C-beams" generally having the shape of the letter C. The blade assembly 108 further includes a blade spar 117 coupled to the torsional pitch member 114. As shown, the blade spar 117 is coupled to an upper and lower portion of the torsional pitch member 144 such that twisting of the torsional pitch member 114 causes the blade spar 117 to change orientation, thereby altering the aerodynamic properties of the blade assembly 108 (e.g., the blade angle). According to various embodiments, the blade spar 117 is coupled to the torque tube 116 (see FIG. 9. For example, the blade spar 117 may be coupled and extend radially away from the blade assembly 108 in a direction away from an axis of rotation of the blade assembly 108. According to various embodiments, the blade spar 117 is integrally formed with the torque tube 116.

As shown, the blade assembly 108 further includes a first core 180, a second core 182, and a third core 184. The first core 180 is proximate the trailing edge of the rotor blade 108 and fills in some or all of the area between the trailing edge of the torsional pitch member 114 and the skin 109. The second core 182 fills a central portion of the torsional pitch member 114. The third core 184 is proximate the leading edge of the rotor assembly 108 and fills in some or all of the area between the leading edge of the torsional pitch member 114 and the skin 109. The first core 180, the second core 182, and the third core 184 may be made of a lightweight material. The first core 180, the second core 182, and the third core 184 may provide structural strength and/or dampen vibratory forces within the blade assembly 108.

Various numerical values herein are provided for reference purposes only. Unless otherwise indicated, all numbers expressing quantities of properties, parameters, conditions, and so forth, used in the specification and claims are to be understood as being modified in all instances by the term "about" or "approximately." Accordingly, unless indicated to the contrary, the numerical parameters set forth in the following specification and attached claims are approximations. Any numerical parameter should at least be construed in light of the number reported significant digits and by applying ordinary rounding techniques. The term "about" or "approximately" when used before a numerical designation, e.g., a quantity and/or an amount including range, indicates approximations which may vary by (+) or (−) 10%, 5%, or 1%.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. The devices, systems and methods described herein may be embodied in other specific forms without departing from the characteristics thereof. The foregoing implementations are illustrative rather than limiting of the described systems and methods. The scope of the systems and methods described herein is thus indicated by the appended claims, rather than the foregoing description, and changes that come within the meaning and range of equivalency of the claims are embraced therein.

What is claimed is:

1. A rotor assembly connectable to a rotor hub configured to rotate about a center axis, the rotor assembly comprising:
   a blade comprising
      a torsional pitch member coupled to the rotor hub;
      a torque tube coupled to the torsional pitch member, wherein the torsional pitch member extends away from the center axis through a portion of the torque tube; and
      a blade spar coupled to the torque tube; and
   a pitch control member coupled to the torque tube and configured to control a pitch angle of the blade, the pitch control member being configured to apply a torsional force to the torque tube to control the pitch angle of the blade,
   the torsional pitch member includes a first curvilinear channel and a second curvilinear channel each having a front side and a back side, wherein the first curvilinear channel and the second curvilinear channel are disposed adjacent to each other, such that the back side of the first curvilinear channel faces the back side of the second curvilinear channel.

2. The rotor assembly of claim 1, wherein the torsional pitch member has a first edgewise blade frequency that is higher than about 1 HZ and less than or equal to about 1.3 Hz.

3. The rotor assembly of claim 2, wherein the torsional pitch member has a first flapwise frequency greater than or equal to about 1.1 Hz.

4. The rotor assembly of claim 1, wherein the torsional pitch member is integrally formed with the rotor hub.

5. The rotor assembly of claim 1, wherein the torque tube is integrally formed with a blade spar extending away from the center axis.

6. The rotor assembly of claim 1, wherein the torque tube has a circular cross section proximate a first location, wherein the first location is between ten percent and twenty percent of a radial length of the pitch control member, wherein the radial length is defined as a distance from the center axis.

7. A co-axial rotary wing aircraft, comprising:
   a first rotor hub configured to spin about a central axis in a first direction;
   a first torsional pitch member extending away from the central axis and coupled to the first rotor hub at a first position such that the first torsional pitch member does not hinge about the first rotor hub, wherein the first torsional pitch member includes a first curvilinear channel and a second curvilinear channel each having a front side and a back side, wherein the first curvilinear channel and the second curvilinear channel are disposed adjacent to each other, such that the back side of the first curvilinear channel faces the back side of the second curvilinear channel;
   a first blade coupled to the first rotor hub and associated with a first pitch angle;
   a first torque tube coupled to the first torsional pitch member such that a portion of the first torque tube surrounds the first torsional pitch member;
   a second rotor hub configured to spin about the central axis in a second direction that is opposite the first direction;

a second torsional pitch member extending away from the central axis and coupled to the second rotor hub at a second position such that the second torsional pitch member does not hinge about the second rotor hub;

a second blade coupled to the second rotor hub and associated with a second pitch angle; and a second torque tube coupled to the second torsional pitch member such that a portion of the second torque tube surrounds the second torsional pitch member.

8. The co-axial rotary wing aircraft of claim 7, further comprising a pitch control assembly configured to control the first pitch angle and the second pitch angle.

9. The co-axial rotary wing aircraft of claim 7, wherein the second torsional pitch member includes a third curvilinear channel and a fourth curvilinear channel each having a front side and a back side, wherein the third curvilinear channel and the fourth curvilinear channel are disposed adjacent to each other, such that the back side of the third curvilinear channel faces the back side of the fourth curvilinear channel.

10. The co-axial rotary wing aircraft of claim 8, wherein the pitch control assembly includes:
a first pitch horn coupled to the first torque tube and the first torsional pitch member such that the first pitch horn is rotatable about the first torsional pitch member, wherein rotation of the first pitch horn adjusts the first pitch angle; and
a second pitch horn coupled to the second torque tube and the second torsional pitch member such that the second pitch horn is rotatable about the second torsional pitch member, wherein rotation of the second pitch horn adjusts the second pitch angle.

11. The co-axial rotary wing aircraft of claim 10, wherein rotation of the first pitch horn further causes the first torsional pitch member to twist, and wherein rotation of the second pitch horn further causes the second torsional pitch member to twist.

12. The co-axial rotary wing aircraft of claim 11, wherein the rotation of the first pitch horn does not cause the first torsional pitch member to twist at the first position and causes the first torsional pitch member to twist at a third position on the first torsional pitch member, wherein the third position is farther from the first rotor hub than the first position.

13. The co-axial rotary wing aircraft of claim 7, wherein the first torsional pitch member is integrally formed with the upper rotor hub.

14. The co-axial rotary wing aircraft of claim 7, wherein the first torque tube is integrally formed with a first blade spar extending away from the central axis.

15. The co-axial rotary wing aircraft of claim 7, wherein the first torsional pitch member has a first flapwise frequency greater than about 1.1 Hz.

16. A method of controlling a co-axial rotary wing aircraft, the method comprising:
controlling, by a pitch control member, a pitch input to a pitch horn, the pitch horn being coupled to a rotor assembly including:
a rotor hub configured to rotate about a center axis;
a blade defining a pitch angle and comprising:
a torsional pitch member coupled to the rotor hub, wherein the torsional pitch member includes a first curvilinear channel and a second curvilinear channel each having a front side and a back side, wherein the first curvilinear channel and the second curvilinear channel are disposed adjacent to each other, such that the back side of the first curvilinear channel faces the back side of the second curvilinear channel;
a torque tube coupled to the torsional pitch member, wherein the torsional pitch member extends away from the center axis through a portion of the torque tube; and
a blade spar coupled to the torque tube.

17. The method of claim 16, wherein the pitch horn is configured to apply a torsional force to the torque tube to control the pitch angle of the blade.

18. The method of claim 16, wherein the pitch horn is further configured to apply a torsional force to the torsional pitch member, such that the torsional pitch member experiences a twist along a longitudinal axis extending from the rotor hub.

19. The method of claim 18, wherein an amount of twist experienced by the torsional pitch member is smaller in magnitude at a location proximate the rotor hub than at a position further from the rotor hub.

20. The method of claim 16, wherein the torsional pitch member is integrally formed with the rotor hub.

21. The rotor assembly of claim 1, wherein the first curvilinear channel and the second curvilinear channel extend from the torque tube into the blade spar and are disposed adjacent to each other without an intervening structure positioned therebetween within the torque tube, and are not adjacent to each other within the blade spar.

* * * * *